United States Patent
Hashimoto et al.

(10) Patent No.: US 6,922,004 B2
(45) Date of Patent: Jul. 26, 2005

(54) AXIAL FLUX MOTOR ASSEMBLY

(75) Inventors: Fukuo Hashimoto, North Canton, OH (US); Rao-Sheng Zhou, Canton, OH (US); Mircea Gradu, Wooster, OH (US)

(73) Assignee: The Timken Company, Canton, OH (US)

( * ) Notice: Subject to any disclaimer, the term of this patent is extended or adjusted under 35 U.S.C. 154(b) by 221 days.

(21) Appl. No.: 10/295,227

(22) Filed: Nov. 15, 2002

(65) Prior Publication Data

US 2003/0189388 A1 Oct. 9, 2003

Related U.S. Application Data

(63) Continuation-in-part of application No. 10/116,974, filed on Apr. 5, 2002, now abandoned.

(51) Int. Cl.$^7$ .................................................. H02K 1/22
(52) U.S. Cl. .................. 310/268; 310/75 C; 310/75 R; 180/65.5
(58) Field of Search .............................. 310/268, 67 R, 310/67 A, 75 C, 75 R, 264, 90, 89, 91, 112, 114, 267; 180/65.5, 65.6

(56) References Cited

U.S. PATENT DOCUMENTS

| | | | |
|---|---|---|---|
| 1,858,506 A | | 5/1932 | Jacobs |
| 4,402,374 A | | 9/1983 | Knur et al. |
| 4,823,039 A | | 4/1989 | Lynch |
| 4,930,590 A | | 6/1990 | Love et al. |
| RE33,628 E | * | 7/1991 | Hahn .......................... 310/268 |
| 5,127,485 A | | 7/1992 | Wakuta et al. |
| 5,334,899 A | * | 8/1994 | Skybyk ....................... 310/268 |
| 5,397,953 A | * | 3/1995 | Cho ............................ 310/254 |
| 5,419,406 A | | 5/1995 | Kawamoto et al. |
| 5,472,059 A | * | 12/1995 | Schlosser et al. .......... 180/65.5 |

(Continued)

FOREIGN PATENT DOCUMENTS

| | | |
|---|---|---|
| DE | 4110638 | 10/1992 |
| EP | 1111759 | 6/2001 |
| JP | 07017425 | 1/1995 |
| JP | 07096752 | 4/1995 |
| JP | 10053131 | 2/1998 |
| JP | 10258642 | 9/1998 |
| RU | 808340 | 2/1981 |
| WO | 0272380 | 9/2002 |

OTHER PUBLICATIONS

Profumo et al., "Novel Axial Flux Interior PM Synchronous Motor Realized With Powdered Soft Magnetic Materials", IEEE, Oct. 12, 1998, pp. 152–158, 7 pages.

(Continued)

*Primary Examiner*—Tran Nguyen
*Assistant Examiner*—Leda Pham
(74) *Attorney, Agent, or Firm*—Polster, Lieder, Woodruff & Lucchesi L.C.

(57) ABSTRACT

A power unit assembly which has a pair of mirrored axial flux electric motors having a common axis of rotation, each axial flux motor including a rotor disposed on a rotor shaft and at least one stator disposed in operative relationship to said rotor. A common end plate is disposed between each of the pair of axial flux electric motors to provide a common mounting structure, while an output hub is operatively coupled to each rotor shaft of the pair of mirrored axial flux electric motors. Each of the pair of mirrored axial flux electric motors is operatively configured to provide independent speed and torque to each associated output hub.

31 Claims, 8 Drawing Sheets

U.S. PATENT DOCUMENTS

| | | | |
|---|---|---|---|
| 5,528,094 A | * | 6/1996 | Hasebe et al. ............... 310/112 |
| 5,532,535 A | | 7/1996 | Oltmanns |
| 5,616,097 A | | 4/1997 | Dammon |
| 5,646,467 A | | 7/1997 | Floresta et al. |
| 5,886,450 A | | 3/1999 | Kuehnle |
| 6,034,465 A | | 3/2000 | McKee et al. |
| 6,198,182 B1 | | 3/2001 | Bustamante et al. |
| 6,276,475 B1 | * | 8/2001 | Nakanosono ............... 180/65.8 |
| 6,356,003 B1 | | 3/2002 | Fiorenza et al. |
| 6,373,160 B1 | * | 4/2002 | Schrodl ...................... 310/114 |
| 6,605,883 B2 | * | 8/2003 | Isozaki et al. ............ 310/49 R |

OTHER PUBLICATIONS

Sitapati et al., "Performance Comparisons of Radial and Axial Field, Permanent Magnet, Brushless Machines", IEEE 2000, vol. 1, pp. 228–234, 7 pages.

International Search Report for corresponding foreign counterpart application PCT/US03/10252, mailed Sep. 16, 2004, 2 pages.

* cited by examiner

AXIAL FLUX MOTOR ASSEMBLY

CROSS-REFERENCE TO RELATED APPLICATIONS

The present application is a continuation-in-part of U.S. patent application Ser. No. 10/116,974, filed on Apr. 5, 2002, now abandoned from which priority is claimed.

STATEMENT REGARDING FEDERALLY SPONSORED RESEARCH

Not Applicable.

BACKGROUND OF THE INVENTION

The present invention relates generally to a vehicle driveline support assembly and, more particularly, to a vehicle driveline support assembly incorporating a pair of electric motors wherein the driveline support, the pair of electric motors, and a pair of speed reduction transmissions are combined into a single compact power unit with two independent co-axial output shafts which may be independently controlled for speed and torque.

A variety of driveline support assemblies are known in the art that utilize electric motors to power a driveline or vehicle wheel when accelerating or maintaining driveline motion, or to generate electricity from the driveline's kinetic energy when decelerating. In the past, these systems have used separate bearings for the electric motor, the driveline support and the speed reduction transmission. However, using separate bearings only adds the cost and weight of the assembly and causes the assembly to be less compact. The present invention solves this problem by reducing the number of bearings required in order to make the driveline support assembly lighter, more compact and less expensive to manufacture.

BRIEF SUMMARY OF THE INVENTION

Briefly stated, the present invention provides an assembly comprising a pair of electric motors and a pair of speed reduction transmissions within a single electric motor case and a driveline support. Each electric motor comprises a stator and a rotor, wherein the rotor is connected to a rotor shaft. A rotor support bearing rotatingly supports each rotor shaft. A driveline support supports a pair of hubs rotatably attached to the housing by a bearing. A case is attached to the housing and supports each stator and an associated speed reduction transmission. Each speed reduction transmission comprises a sun element, at least two planetary elements and an outer ring element attached to the case. Each rotor shaft is attached to a hub through an associated speed reduction transmission. Finally, each rotor shaft, speed reduction transmission, and hub are supported solely by the rotor support bearing, the driveline support bearing, and the outer ring element of the case. A shoulder portion of each rotor shaft abuts an end of the rotor support bearing such that a desired air gap is maintained between each rotor and associated stators.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
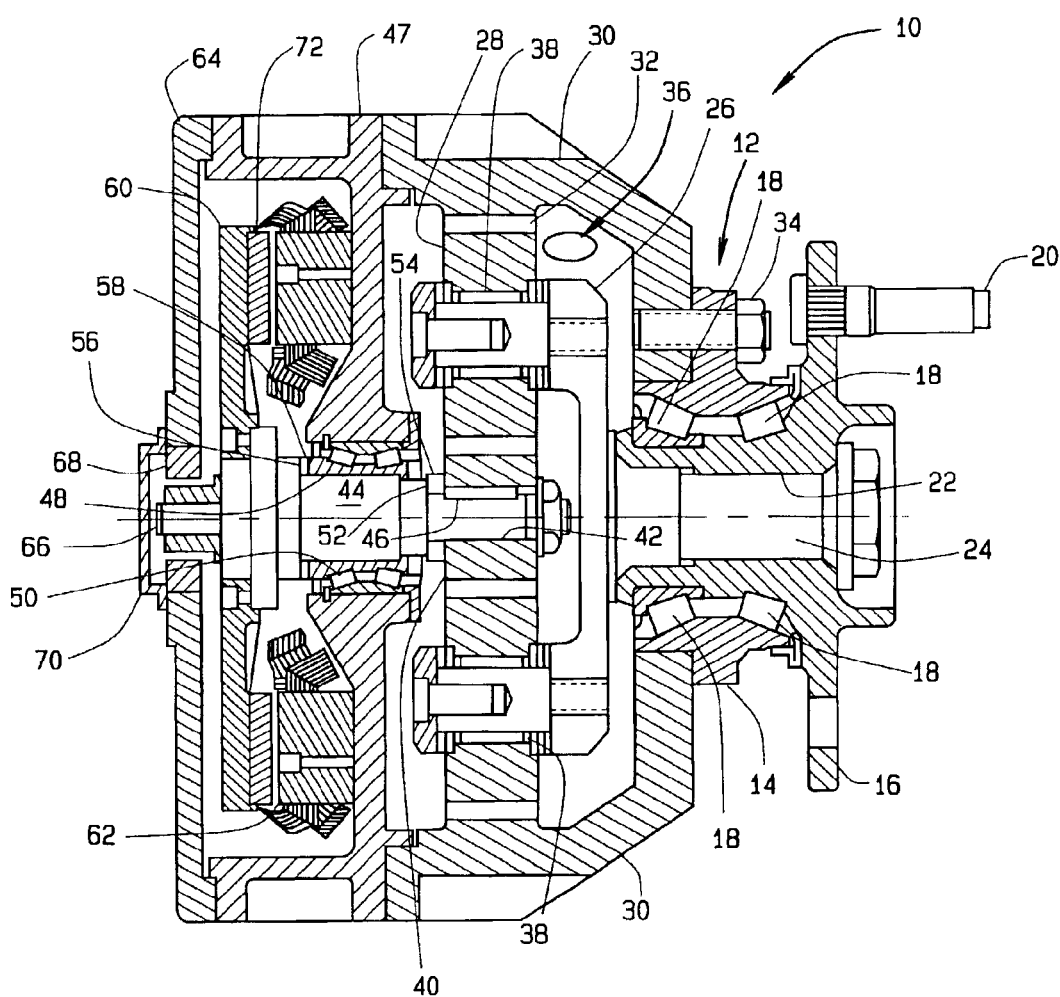
FIG. 1 is a section view of an integral wheel bearing and axial flux motor having one stator.

The present invention comprises an integral wheel support, planetary transmission and electric motor assembly requiring only two support bearings: a wheel support bearing and a rotor support bearing. Referring to FIG. 1, the assembly 10 comprises a wheel bearing 12 of conventional design. The wheel bearing 12 comprises a housing 14 and a hub 16. Located between the housing 14 and the hub 16 are two rows of tapered rollers 18 that allow the hub 16 to rotate within the housing 14. While tapered rollers are shown and preferred, other types of rollers may be used without departing from the scope of the present invention. The hub 16 may be attached to a wheel (not shown) with lugs 20. The bearing is a package wheel bearing that has all clearances preset upon assembly.

The hub 16 further defines a splined interior bore 22 for accepting a splined shaft 24. The splined shaft 24 extends from a planetary carrier 26 of a conventional gear drive planetary transmission. The planetary carrier 26 is rotatingly attached to three planetary gears 28 by bearings 38. The planetary gears 28 mesh with a stationary outer ring gear 32 formed on an inner surface of a planetary transmission case 30. The planetary transmission case 30 is attached to the wheel bearing 12 by fasteners 34. The planetary transmission case 30 further defines a vent bore 36.

A sun gear 40 meshes with all three planetary gears 28. The sun gear 40 defines a center bore 42 for receiving a rotor shaft 44. A key 46 prevents relative rotation of the sun gear 40 and the rotor shaft 44. The rotor shaft 44 is rotatingly supported within a motor case 47 by a rotor bearing 48. The rotor bearing 48 comprises two rows of tapered rollers 50 between inner races disposed on the rotor shaft 44. Between a first shoulder 52 of the rotor shaft 44 and the sun gear 40 is located a sun gear spacer 54 which locates the sun gear 40 within the planetary gears. Between a second shoulder 56 of the rotor shaft 44 and the rotor bearing 48, is an air gap washer 58. By controlling the thickness of the air gap washer 58, the axial position of the rotor shaft is manipulated and thus an air gap between a rotor 60 and stator 62 is adjusted. The stator 62 is attached to the motor case 47, and the rotor 60 is attached to the rotor shaft 44.

Figure 2:
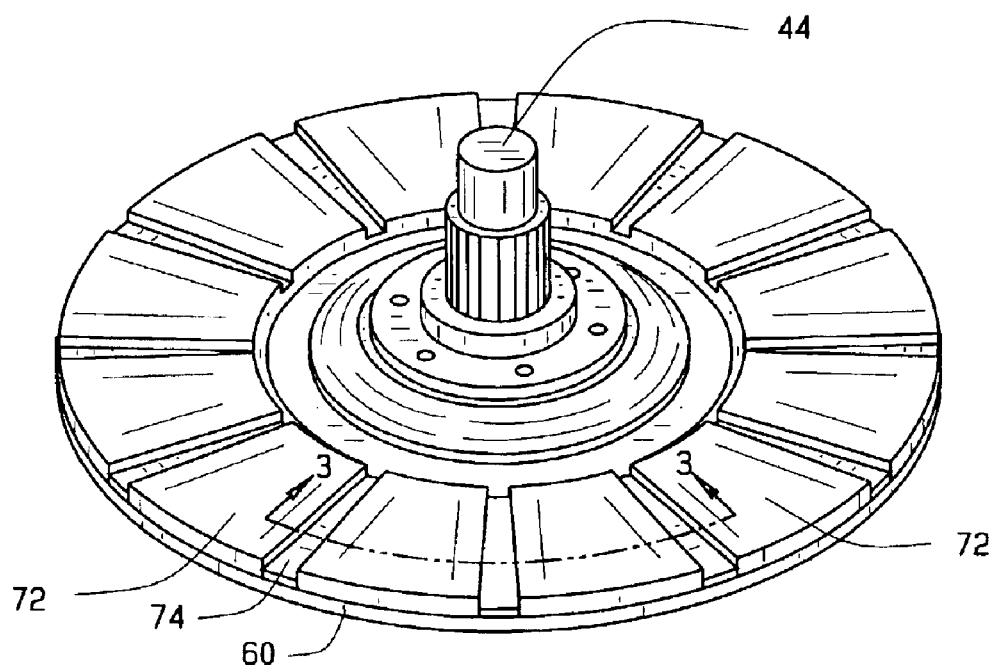
FIG. 2 is a perspective view of a rotor of an axial flux electric motor shown in FIG. 1.
Figure 3:
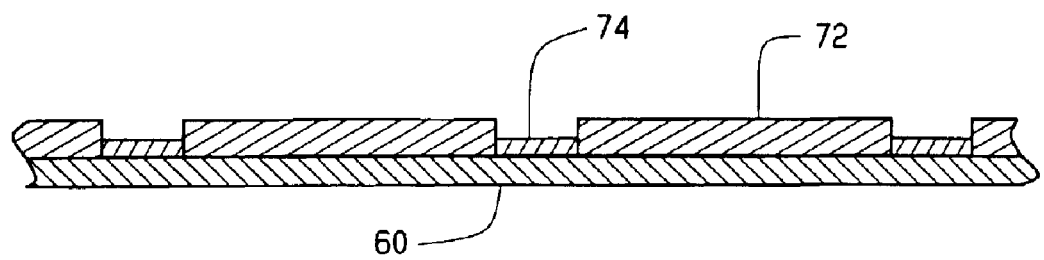
FIG. 3 is a section view of the rotor of FIG. 2 along line A—A.

Referring to FIG. 2 and FIG. 3, the rotor may be made from low carbon steel. The rotor 60 has several permanent magnets 72 attached by an acrylic adhesive, such as Loctite Multibond acrylic adhesive available from the Loctite Corporation, Rocky Hill, Conn. The magnets 72 are spaced apart by nonmetallic spacers 74. The magnets 72 are preferably neodymium-iron-boron (Nd—Fe—B) type permanent magnets and the number of magnets determines the number of poles of the motor (i.e. if twelve magnets are adhered to the rotor, the motor has twelve poles). The magnets 72 are attached to the rotor 60 with their north-seeking faces and south-seeking faces outwardly arranged in an alternating sequence.

Figure 4:
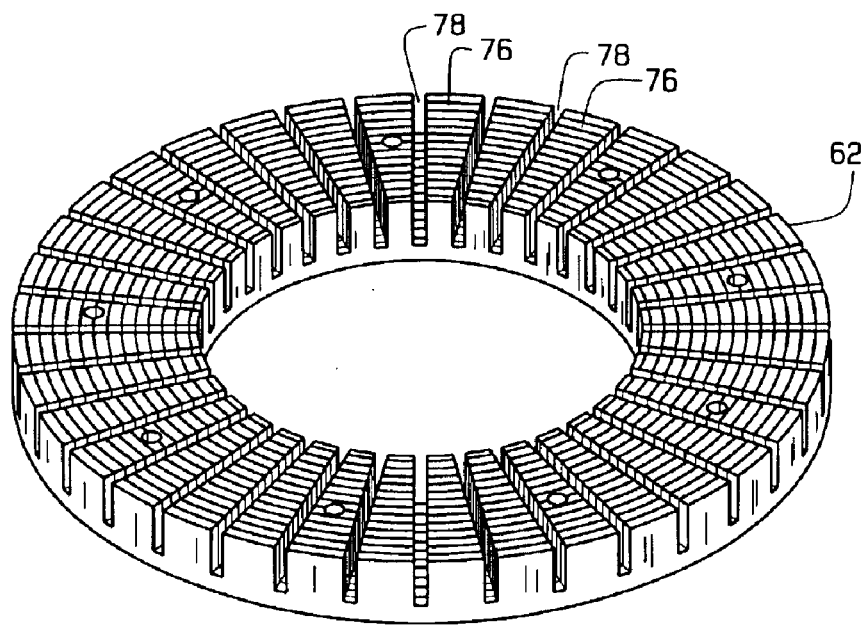
FIG. 4 is a perspective view of a stator of an axial flux electric motor shown in FIG. 1.
Figure 5A:
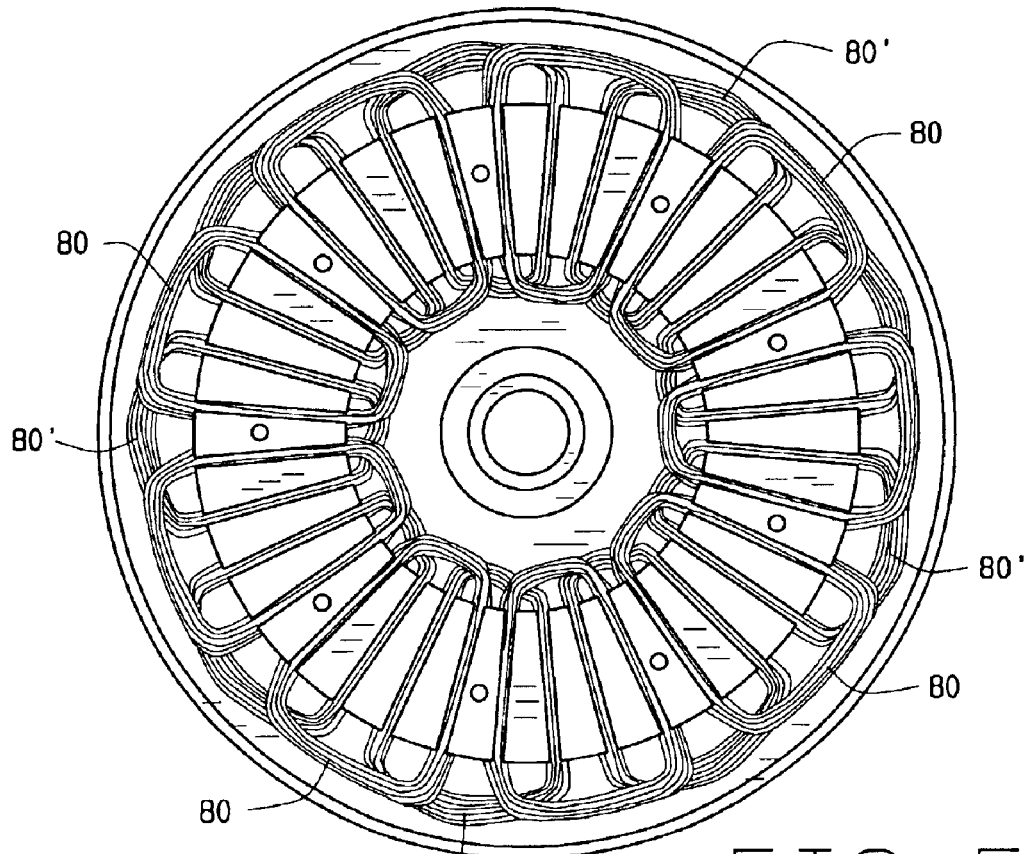
FIG. 5A is a front plan view of the stator of FIG. 4, including windings and an attached case.
Figure 5B:
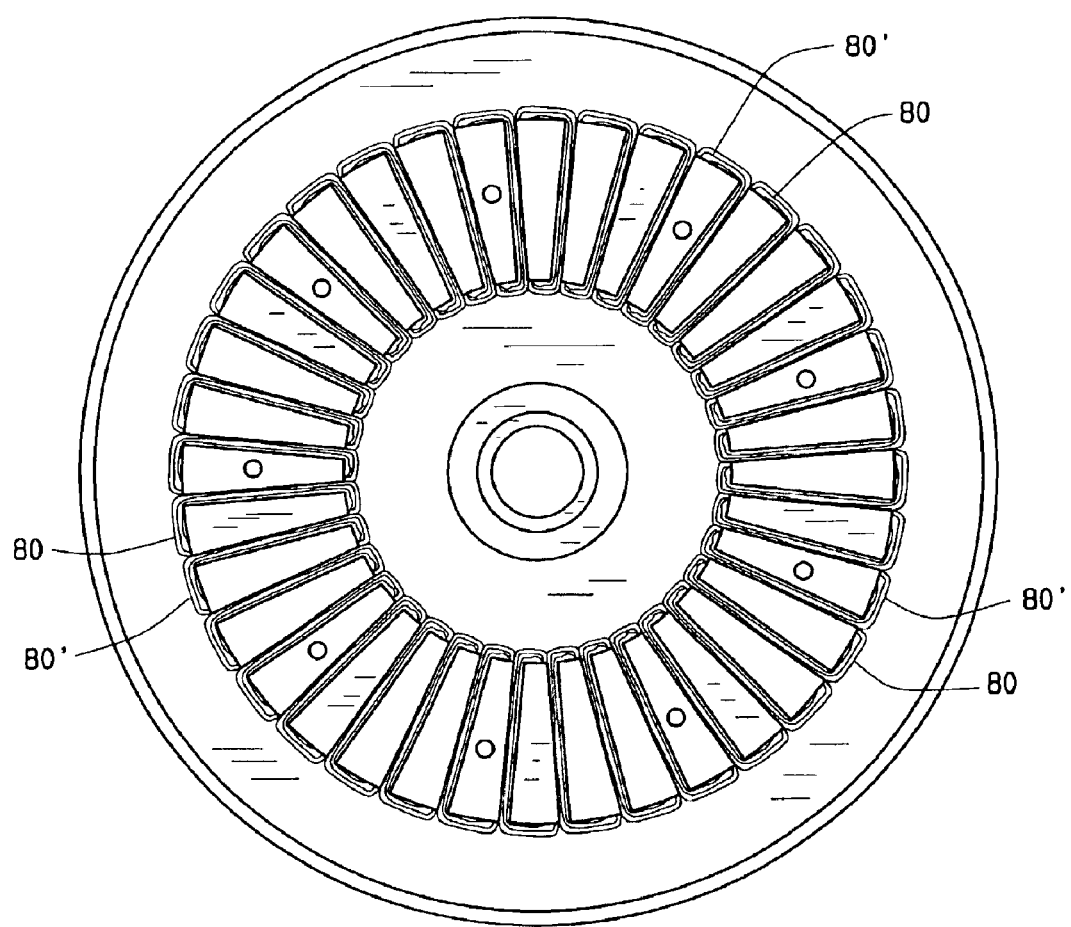
FIG. 5B is a front plan view of the stator of FIG. 4, including an alternate simplified winding arrangement.

Referring to FIG. 4, the stator 62 comprises a plurality of laminations. More specifically, the stator 62 comprises laminations of ferrous material, preferably iron, that are separated by non-conducting, non-ferrous layers to minimize losses due to eddy currents of magnetic flux within the stator 62. The stator 62 further comprises thirty-six slides 76 defined by thirty-six grooves 78. As shown in FIG. 5A, conductive windings 80 comprising loops of insulated copper wire are placed within the grooves 78 and around the slides 76 such that each winding 80 forms a loop surrounding two intervening grooves 78. Another winding 80' is placed within a groove 78 a portion of which surrounded by the first winding 80 and a groove 78 adjacent the first winding 80. In this manner, windings 80 are placed within the grooves 78 of the stator 62 until every groove 78 has been fitted with a winding 80. FIG. 5B illustrates an alternative simplified winding pattern using a reduced quantity of material.

Referring back to FIG. 1, the rotor shaft 44 further comprises a rotor shaft extension 66 that extends within a bore of a resolver 68. An end plate 64 is attached to the motor case 47 and supports the resolver 68. A cover plate 70 covers a bore within the end plate 64 that allows access to the resolver 68 without removing the end plate 64.

The motor operates in a conventional manner for a brushless axial flux induction motor, and changing the thickness of the air gap washer 58 changes the air gap of the axial flux electric motor. The motor is controlled by a known electronic controller that adjusts the pulse width and frequency of current traveling through the wire loops of the stator in order to control the torque and speed of the motor and maintain current within motor limitations.

Figure 6:
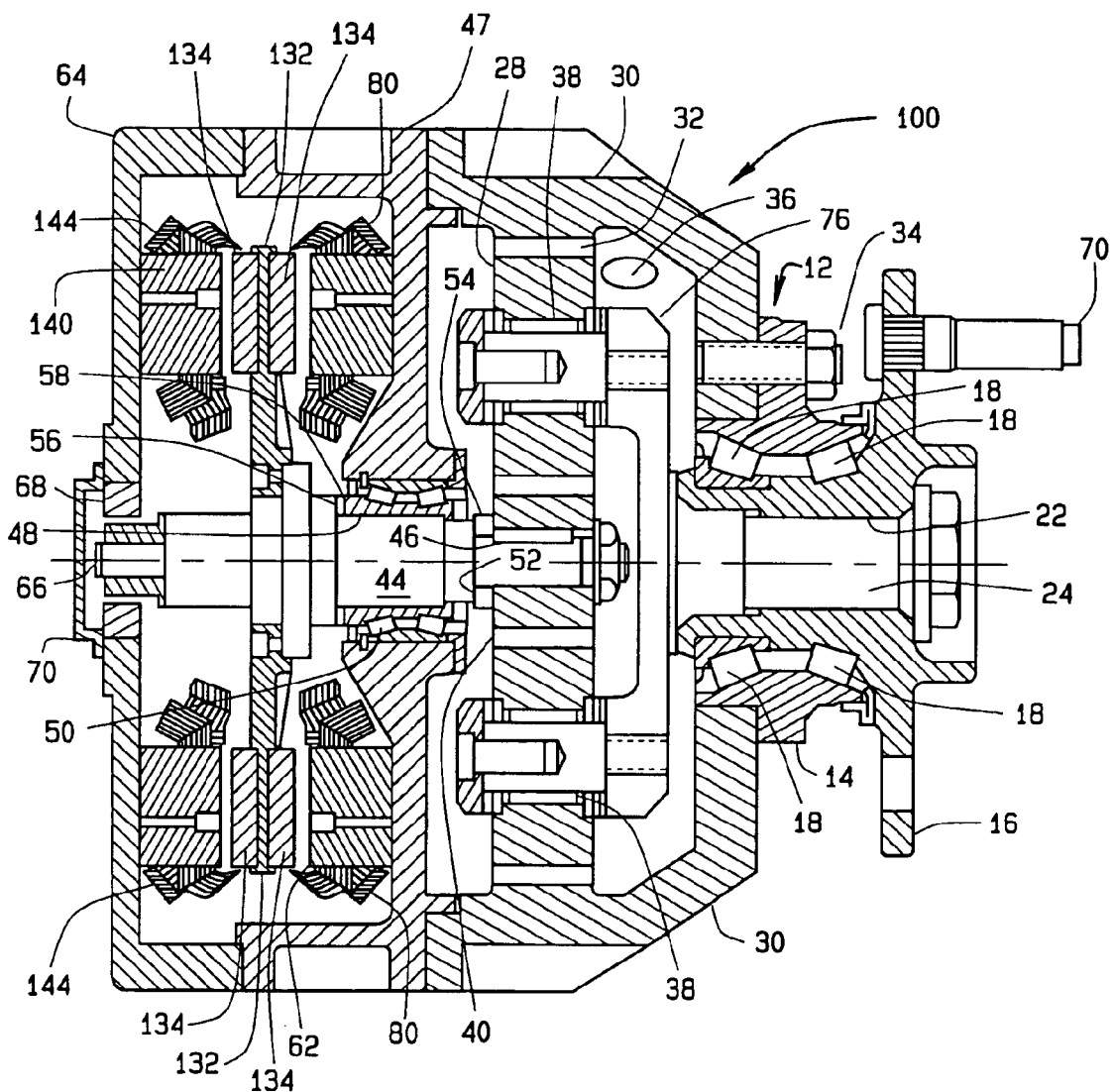
FIG. 6 is a section view of an integral wheel bearing and axial flux motor having two stators.

An alternate embodiment 100 shown in FIG. 6 includes a rotor 132 having magnets 134 affixed to opposite sides of the rotor 132 by an adhesive. Adjacent magnets 134 on opposite sides of the rotor 132 are aligned so that their opposite poles face outwardly from the rotor 132. In addition to the stator 62 and the windings 80 is a second stator 140 and a second plurality of windings 144 wound within the second stator 140. By adding the second stator 140 and windings 144, the output of the axial flux motor is nearly doubled.

Figure 7A:
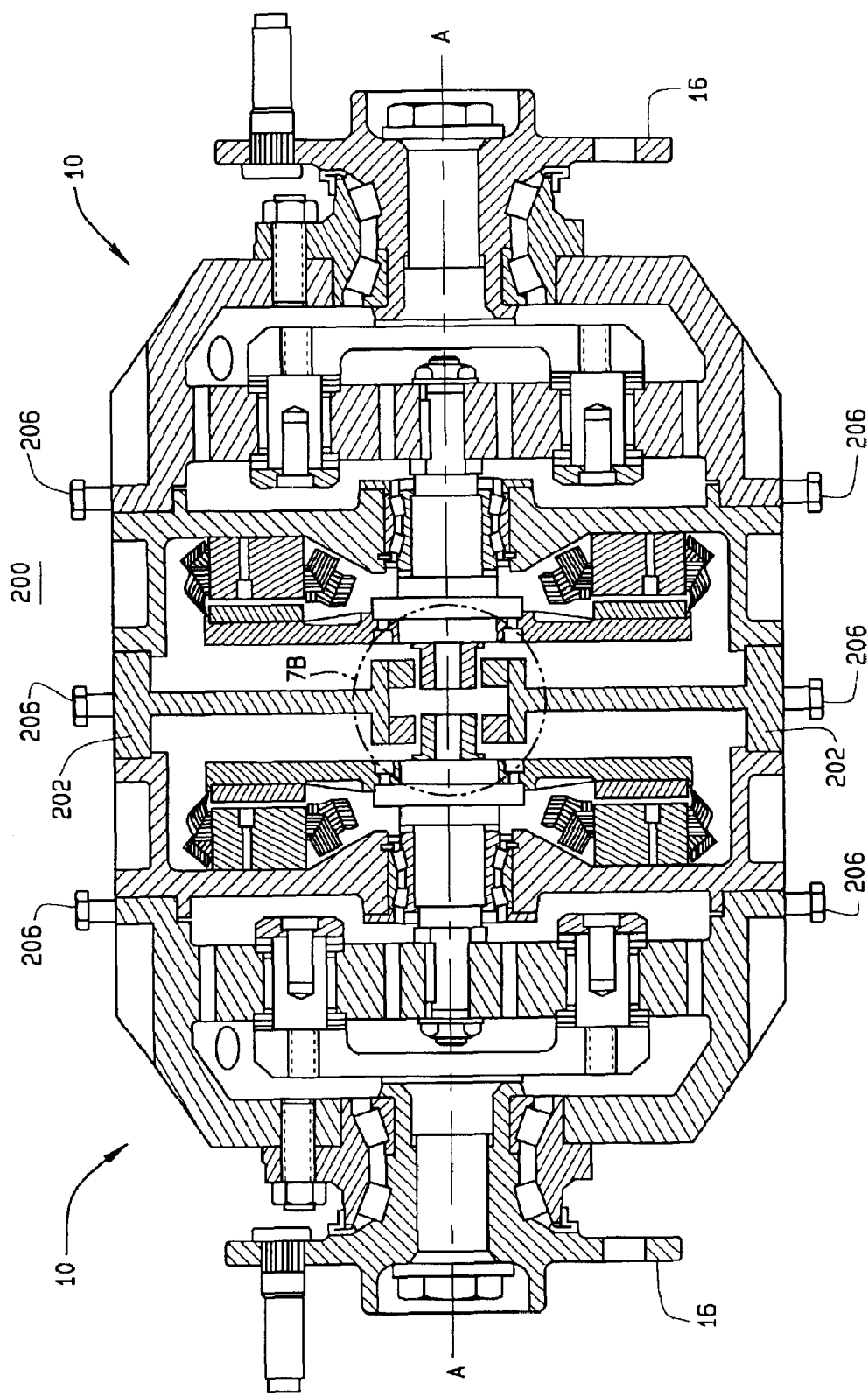
FIG. 7A is a section view of a pair of combined axial flux motors, each having one stator according to an embodiment of the present invention.
Figure 7B:
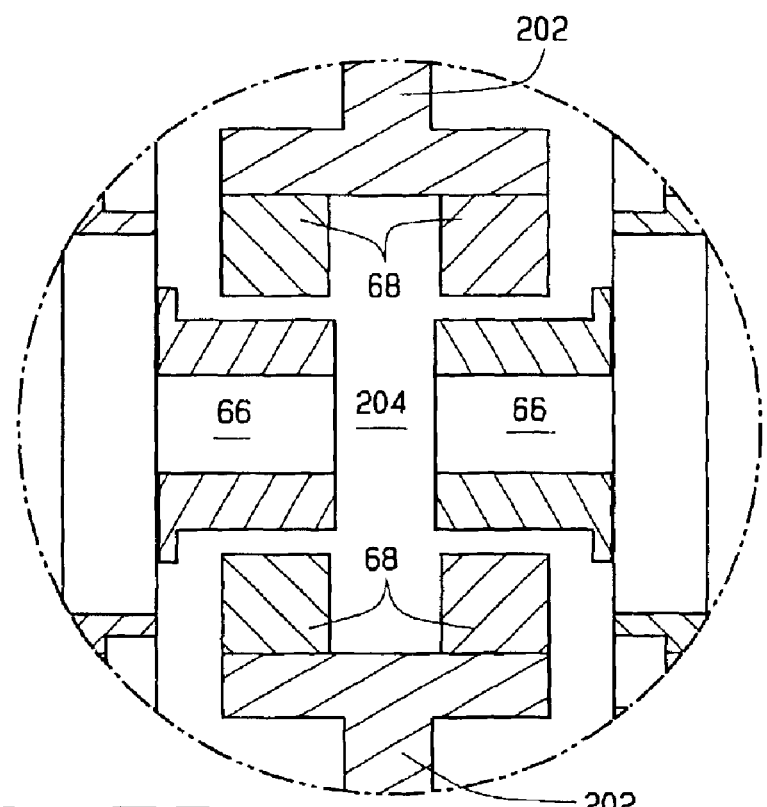
FIG. 7B is an enlargement of section 7B, shown in FIG. 7A.
Figure 8B:
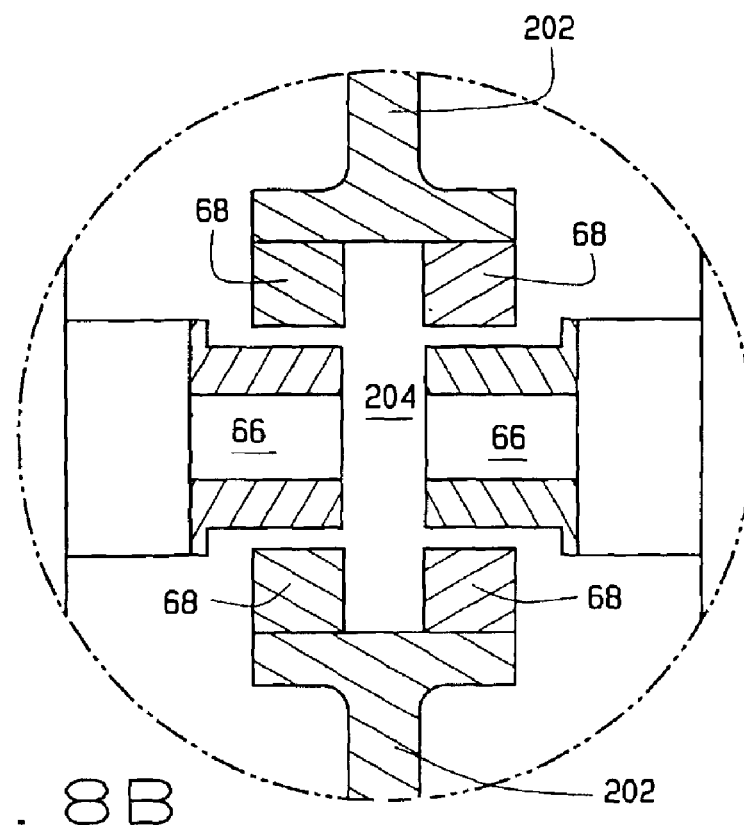
FIG. 8B is an enlargement of section 8B, shown in FIG. 8A.
Figure 8A:
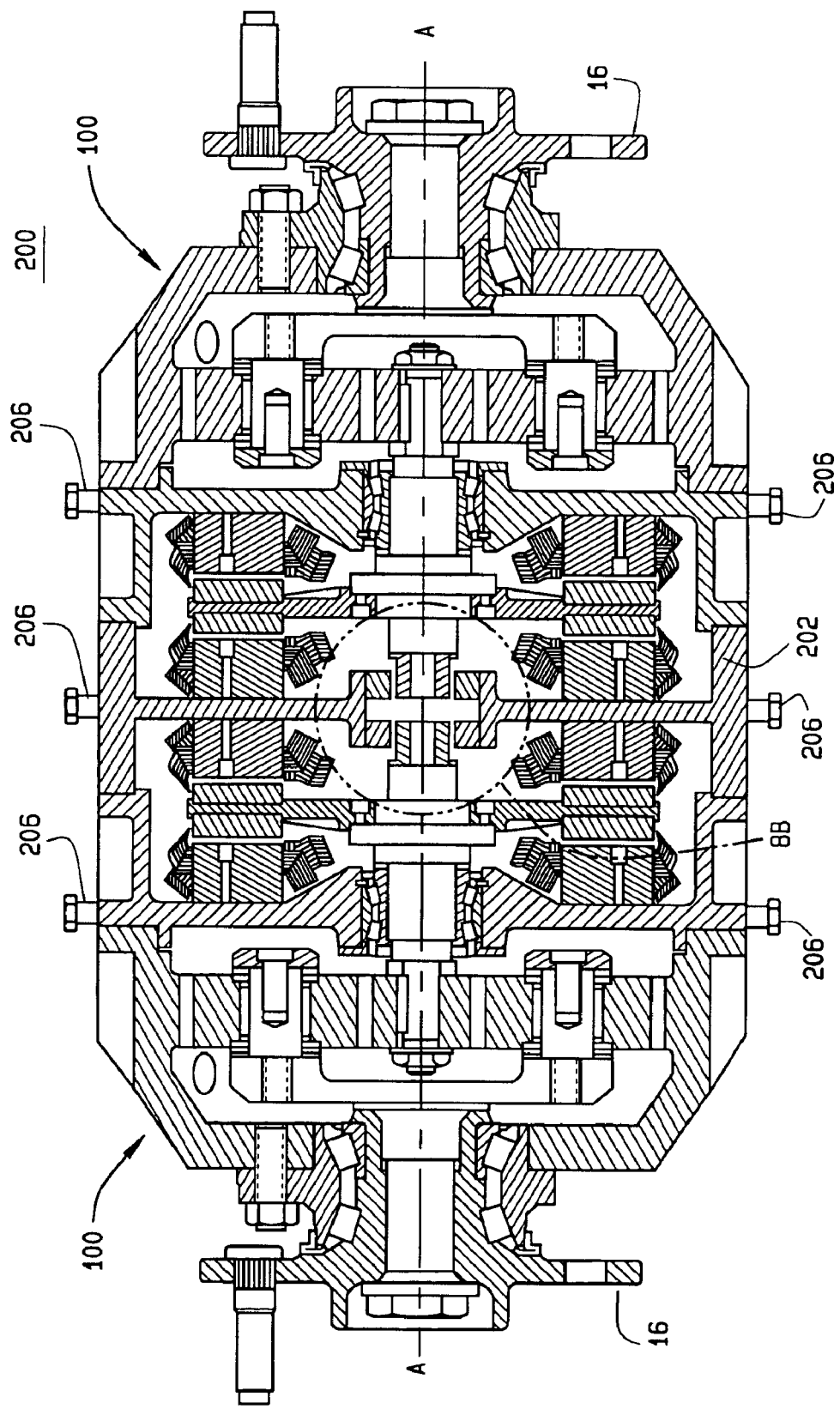
FIG. 8A is a section view of a pair of combined axial flux motors, each having two stators according to an embodiment of the present invention.

In a compact power unit embodiment 200, shown in FIGS. 7A and 8A, a pair of axial flux motor assemblies 10 or axial flux motor assemblies 100, as described in detail above, are coupled together in mirrored or back-to-back alignment with a common end plate 202. The common end plate 202 includes an axial bore 204, shown in FIGS. 7B and 8B for supporting a pair of resolvers 68 and for receiving the rotor shaft extension 66 from each rotor shaft 44 in the compact power unit 200. Stator cooling connections 206 are secured to each motor case 47 to carry out heat generated by the windings 80 during heavy duty cycles.

The compact power unit 200 provides two identical independent output hubs 16, having a common axis of rotation A—A, onto which a pair of drive axles or wheels (not shown) may be secured. The compact power unit 200 is suitable for mounting at an axle centerline of a vehicle to drive either directly or indirectly, a pair of vehicle wheels on opposite sides of the vehicle. Each assembly 10, 10 or 100, 100 in the compact power unit 200 is independently controllable as described above, to regulate speed and torque at each independent output hub 16.

Independent speed and torque control for opposite wheels is desirable when road surface variations at each wheel produce different coefficients of friction, as the lower wheel driving torque of the two wheels limits the effective driving torque to twice the lowest wheel torque. The application of torque in excess of the lowest wheel torque level results in spinning of the vehicle wheel. Accordingly, when driving in uneven terrain having varied surface coefficients of friction, it is highly desirable to match the driving power supplied to each individual driven wheel to different driving requirements. Driving the driven wheels of a vehicle at different speeds and individually controlling the driving torque when traveling on a slippery surface or around a curve has the distinct advantages of avoiding vehicle deformation, reducing tire wear, attaining improved traction, and enhancing vehicle dynamic stability.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An assembly comprising:
   an axial flux electric motor comprising a stator and a rotor, said stator and said rotor axially displaced from each other;
   a rotor shaft coupled to said rotor, said rotor shaft including a shoulder portion;
   a rotor support bearing for rotationally supporting said rotor shaft;
   a driveline support for supporting a hub rotatably attached to a housing by a bearing, said hub supporting a wheel;
   a case attached to said housing configured to support said stator and a speed reduction transmission;
   said speed reduction transmission comprising a sun element, at least two planetary elements and an outer ring element attached to said case;
   wherein said rotor shaft is coupled to said hub through said speed reduction transmission;
   wherein said rotor shaft, said speed reduction transmission, and said hub are supported solely by said rotor support bearing, said driveline support bearing and said outer ring element of the case; and wherein said shoulder portion of said rotor shaft abuts an end of said rotor support bearing such that a desired air gap is maintained between said rotor and said stator.

2. The assembly of claim 1 wherein said rotor support bearing and said driveline support bearing each comprise two rows of tapered rollers.

3. The assembly of claim 2 wherein said rotor support bearing and said driveline support bearing each comprise package bearings requiring no bearing adjustment.

4. The assembly of claim 1 further comprising an air gap washer having a bore therethrough, said air gap washer disposed about said rotor shaft between said rotor support bearing and said shoulder portion of said rotor shaft; and wherein a thickness of said air gap washer is selected such that a desired air gap is maintained between said rotor and said stator.

5. The assembly of claim 4 wherein said rotor shaft further comprises an extension opposite said rotor support bearing, said extension projecting within a bore of a resolver supported by said case.

6. The assembly of claim 4 wherein said rotor further comprises a plurality of permanent magnets.

7. The assembly of claim 6 wherein said stator defines grooves and slides and wherein a plurality of conductive windings are placed within said grooves.

8. An integral axial flux induction motor comprising:
a speed reduction transmission;
a housing;
a case secured to said housing;
a stator wound with conductive windings, said stator disposed within said case;
a rotor comprising permanent magnets, said rotor disposed axially adjacent said stator and coupled to a hub through said speed reduction transmission by a rotor shaft;
a package wheel bearing assembly, said package wheel bearing assembly including two rows of tapered rollers disposed between said housing and said hub to allow said hub to rotate thereon;
wherein said speed reduction transmission includes a sun element, at least three planetary elements and an outer ring element formed by the case;
wherein said rotor shaft includes a shoulder portion abutting an end portion of a rotor support bearing to maintain an air gap between said rotor and said stator; and
wherein said rotor shaft, said speed reduction transmission, and said hub are supported entirely by said rotor support bearing, said package wheel bearing assembly, and said outer ring element.

9. The assembly of claim 8 wherein said rotor shaft further comprises a rotor shaft extension extending into a bore within a resolver, said resolver supported by said case.

10. The assembly of claim 8 further comprising a second stator attached to said case on an opposite side of said rotor from said stator and wherein said rotor comprises permanent magnets on opposing sides of said rotor and said shoulder portion of said rotor shaft abuts said end portion of the rotor support bearing to maintain said air gap between said rotor and said stator and a second air gap between said rotor and said second stator.

11. The assembly of claim 10 further comprising an air gap washer disposed between said shoulder of said rotor shaft and said end of said rotor support bearing;

wherein said air gap washer is dimensioned to have a thickness that will provide a desired air gap between said rotor, said stator, and said second stator.

12. The assembly of claim 8 further comprising an air gap washer disposed between said shoulder of said rotor shaft and said end of the rotor support bearing;

wherein said air gap washer is dimensioned to have a thickness that will provide a desired air gap between said rotor and said stator.

13. An assembly comprising:
an axial flux electric motor comprising a pair of stators and a rotor coupled to a rotor shaft;
a rotor support bearing configured to rotationally support said rotor shaft;
a vehicle support bearing comprising a hub rotatably attached to a housing by a bearing;
a case attached to said housing, said case configured to support said pair of stators and a speed reduction transmission, said speed reduction transmission including a sun element, at least two planetary elements and an outer ring element attached to said case;
wherein said rotor shaft is coupled to said hub through said speed reduction transmission;
wherein said rotor shaft, said speed reduction transmission, and said hub are supported solely by said rotor support bearing, said vehicle support bearing, and said outer ring element of said case; and
wherein a shoulder portion of said rotor shaft abuts an end of said rotor support bearing such that a desired air gap is maintained between said rotor and each of said pair of stators.

14. The assembly of claim 13 wherein said rotor support bearing and said vehicle support bearing each comprise two rows of tapered rollers.

15. The assembly of claim 14 wherein said rotor support bearing and said vehicle support bearing each comprise package bearings requiring no bearing adjustment.

16. The assembly of claim 13 further comprising an air gap washer having a bore therethrough, said air gap washer disposed about said rotor shaft between said rotor support bearing and said shoulder portion of said rotor shaft; and wherein a thickness of said air gap washer is selected such that a desired air gap is maintained between said rotor and said pair of stators.

17. The assembly of claim 16 wherein said rotor shaft further comprises an extension opposite said vehicle support, said extension projecting within a bore of a resolver supported by said case.

18. The assembly of claim 16 wherein said rotor further comprises a plurality of permanent magnets disposed on opposite sides of said rotor.

19. The assembly of claim 18 wherein each of said pair of stators defines a plurality of grooves and a plurality of slides; and wherein a plurality of conductive windings are placed within said plurality of grooves and around said plurality of slides.

20. A power unit assembly comprising:
first and second mirrored axial flux electric motor units having a common axis of rotation, each axial flux motor unit including
at least one stator and a rotor, said at least one stator and said rotor each axially displaced from each other;
a case configured to support said at least one stator;
a rotor support bearing secured to said case; and
a rotor shaft axially secured to said rotor, said rotor shaft rotationally supported about an axis of rotation by said rotor support bearing;

a speed reduction transmission coupled to said rotor shaft, said transmission including at least an outer ring element coupled to said case;

an output hub operatively coupled to said rotor shaft through said transmission;

a housing secured to said case;

a hub support bearing disposed in said housing for rotationally supporting said output hub relative to said case; and wherein said rotor shaft includes a shoulder portion adjacent said rotor support bearing, said shoulder portion disposed to maintain a desired air gap between said rotor and said at least one stator; and wherein said rotor shaft, said transmission, and said output hub are supported solely by a combination of said rotor support bearing, said hub support bearing, and said outer ring element;

a common end plate disposed between each of said first and second mirrored axial flux electric motor units; and wherein each of said first and second mirrored axial flux electric motor units is operatively configured to provide independent speed and torque to each associated output hub.

21. The power unit assembly of claim 20 further comprising an air gap washer disposed between each shoulder of each rotor shaft and said associated rotor support bearing, each of said air gap washers dimensioned to have a thickness related to a desired air gap between said associated rotor and said associated at least one stator.

22. The power unit assembly of claim 20 wherein each of said rotor support bearings and each of said hub support bearings comprises one or more rows of tapered rollers.

23. The power unit assembly of claim 20 wherein each of said rotor support bearings and each of said hub support bearings comprises package bearings.

24. The power unit assembly of claim 20 wherein said common end plate includes a pair of resolvers disposed in an axial bore, each resolver having a bore disposed on a common axis with an associated rotor shaft from said first and second mirrored axial flux electric motor units; and wherein each of said associated rotor shafts includes an axial extension disposed within said resolver bore.

25. The power unit assembly of claim 20 wherein each of said first and second mirrored axial flux electric motor units includes a pair of stators; and wherein at least one of said pair of stators in each of said first and second mirrored axial flux electric motor units is disposed on said common end plate.

26. The power unit assembly of claim 20 wherein each rotor comprises a plurality of permanent magnets disposed on opposite sides of said rotor.

27. The power unit assembly of claim 20 wherein each of said at least one stators defines a plurality of grooves and a plurality of slides and wherein a plurality of conductive windings are disposed within said grooves and around said slides.

28. An assembly comprising:

a first axial flux electric motor including at least one stator and a rotor, said at least one stator and said rotor each axially displaced from each other;

a case configured to support said at least one stator;

a rotor support bearing secured to said case; and a rotor shaft axially secured to said rotor, said rotor shaft rotationally supported about an axis of rotation by said rotor support bearing;

a first transmission coupled to said rotor shaft, said transmission including at least an outer ring element coupled to said case;

a first hub operatively coupled to said rotor shaft through said transmission;

a first hub support bearing for rotationally supporting said hub relative to said case; and wherein said rotor shaft includes a shoulder portion adjacent said rotor support bearing, said shoulder portion disposed to maintain a desired air gap between said rotor and said at least one stator; and wherein said rotor shaft, said transmission, and said hub are supported solely by a combination of said rotor support bearing, said hub support bearing, and said outer ring element.

29. The assembly of claim 28 further including:

an end plate secured to said case of said first axial flux motor axially opposite from said hub;

a second axial flux motor secured to said end plate opposite from said first axial flux motor, said second axial flux motor including at least one stator and a rotor, said at least one stator and said rotor each axially displaced from each other;

a case configured to support said at least one stator;

a rotor support bearing secured to said case; and a rotor shaft axially secured to said rotor, said rotor shaft rotationally supported about an axis of rotation by said rotor support bearing;

a second transmission coupled to said rotor shaft, said transmission including at least an outer ring element coupled to said case;

a second hub operatively coupled to said rotor shaft through said transmission;

a second hub support bearing for rotationally supporting said hub relative to said case; and wherein said second axial flux motor rotor shaft includes a shoulder portion adjacent said second axial flux rotor support bearing, said shoulder portion disposed to maintain a desired air gap between said rotor and said at least one stator included in said second axial flux motor; and wherein said second axial flux motor rotor shaft, said second transmission, and said second hub are supported solely by a combination of said second axial flux motor rotor support bearing, said second hub support bearing, and said second transmission outer ring element.

30. The assembly of claim 29 wherein each of said first and second transmissions is a speed reduction transmission further including a sun element and at least two planetary elements.

31. The assembly of claim 29 wherein each of said cases is attached to said end plate and wherein each of said first and second axial flux motors includes a housing coupled to said case; and each of said first and second hub support bearings secured to said associated first and second housings.

* * * * *